(12) United States Patent
Candia et al.

(10) Patent No.: US 11,243,138 B2
(45) Date of Patent: Feb. 8, 2022

(54) AUTOMATIC IMPACT INDUCING DEVICE

(71) Applicants: GF Machining Solutions AG, Biel (CH); inspire AG, Zürich (CH)

(72) Inventors: Nicolàs Candia, Zürich (CH); Martin Postel, Zürich (CH); Nerzat Bircan Bugdayci, Zürich (CH)

(73) Assignees: GF Machining Solutions AG; inspire AG

(*) Notice: Subject to any disclaimer, the term of this patent is extended or adjusted under 35 U.S.C. 154(b) by 135 days.

(21) Appl. No.: 16/566,117

(22) Filed: Sep. 10, 2019

(65) Prior Publication Data
US 2020/0086445 A1 Mar. 19, 2020

(30) Foreign Application Priority Data
Sep. 18, 2018 (EP) .................................... 18194975

(51) Int. Cl.
| G01M 7/08 | (2006.01) |
| B23Q 17/09 | (2006.01) |
| G01N 3/34 | (2006.01) |
| G01N 3/307 | (2006.01) |
| G01N 3/30 | (2006.01) |
| G01N 3/32 | (2006.01) |

(52) U.S. Cl.
CPC ............ *G01M 7/08* (2013.01); *B23Q 17/0966* (2013.01); *B23Q 2717/006* (2013.01); *G01N 3/30* (2013.01); *G01N 3/307* (2013.01); *G01N 3/32* (2013.01); *G01N 3/34* (2013.01); *G01N 2203/001* (2013.01); *G01N 2203/0035* (2013.01); *G01N 2203/0676* (2013.01)

(58) Field of Classification Search
CPC .......... G01M 7/08; G01N 3/307; G01N 3/30; G01N 3/32; G01N 3/34; G01N 2203/001; G01N 2203/0035; G01N 2203/0676
See application file for complete search history.

(56) References Cited

U.S. PATENT DOCUMENTS

| 3,103,116 A * | 9/1963 | Kohli ..................... G01N 3/303 |
| | | 73/12.06 |
| 4,313,337 A * | 2/1982 | Myint ..................... G01N 3/34 |
| | | 73/12.13 |
| 4,426,683 A * | 1/1984 | Kissell .................... G01M 7/08 |
| | | 356/616 |
| 5,563,392 A * | 10/1996 | Brown ................... B65G 43/02 |
| | | 235/91 R |
| 8,408,042 B2 * | 4/2013 | Perrier ................... G01N 3/307 |
| | | 73/12.11 |
| 9,719,901 B2 * | 8/2017 | Jackson ................. G01M 7/08 |
| 2011/0132069 A1 | 6/2011 | Perrier et al. |

(Continued)

FOREIGN PATENT DOCUMENTS

CN 204137152 U * 2/2015

OTHER PUBLICATIONS

U.S. Appl. No. 16/426,331, filed May 30, 2019, Martin Postel, et al.

*Primary Examiner* — Jonathan M Dunlap
(74) *Attorney, Agent, or Firm* — Harness, Dickey & Pierce, P.L.C.

(57) ABSTRACT

The present invention is directed to an automatic impact inducing device for inducing an impact on an object wherein, in particular on a machine tool.

8 Claims, 11 Drawing Sheets

(56) References Cited

U.S. PATENT DOCUMENTS

| | | | |
|---|---|---|---|
| 2011/0303429 A1* | 12/2011 | Kohlschmied | B25D 11/005 |
| | | | 173/112 |
| 2015/0300933 A1 | 10/2015 | Jackson et al. | |
| 2017/0225901 A1* | 8/2017 | Brown | B65G 43/02 |
| 2019/0086309 A1* | 3/2019 | Brandt | G01M 7/08 |

* cited by examiner

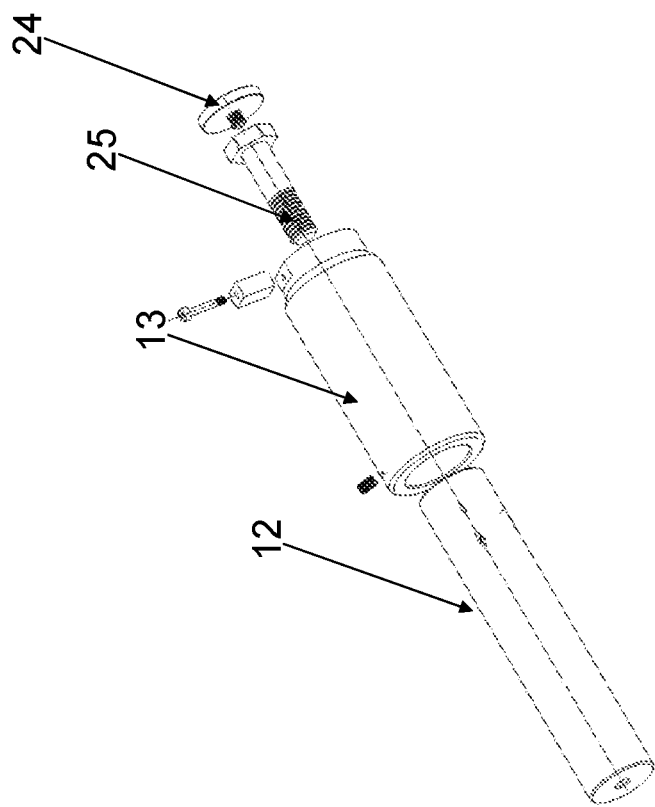
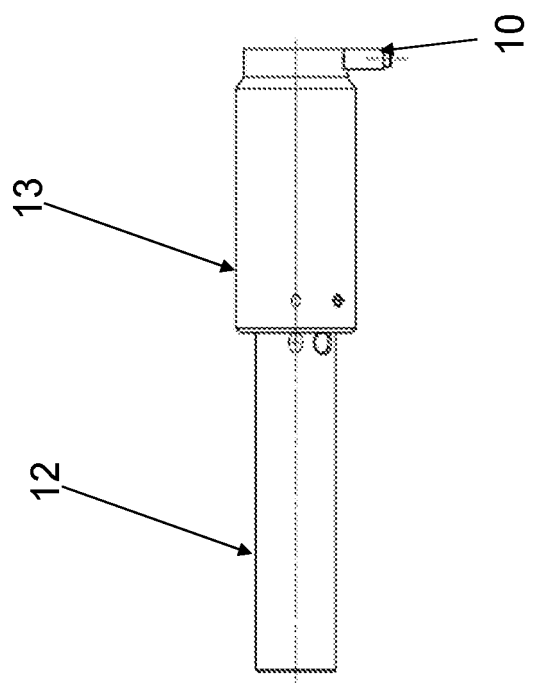

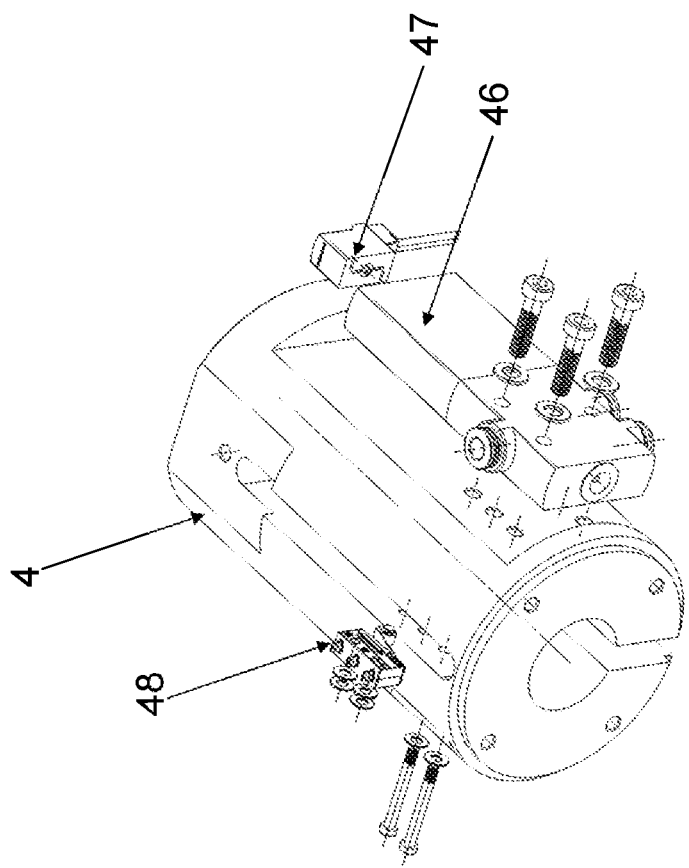
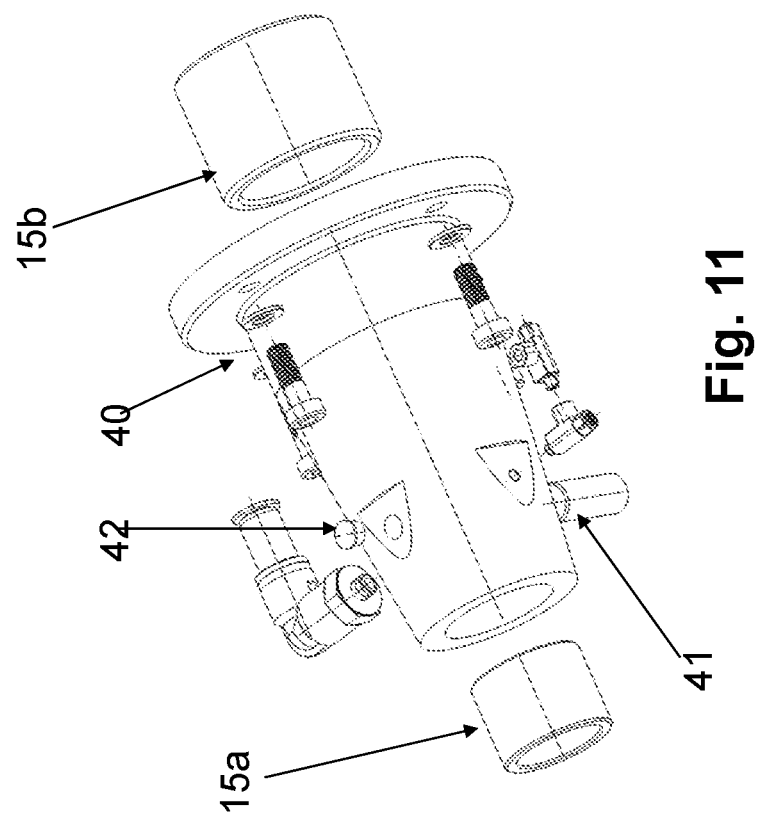

AUTOMATIC IMPACT INDUCING DEVICE

CROSS-REFERENCE TO RELATED APPLICATIONS

This application claims the benefit and the priority of European Patent Application No. 18 194 975.1 filed Sep. 18, 2018. The entire disclosure of the above application is incorporated herein by reference.

1. Field of the Invention

The present invention is directed to an automatic impact inducing device for inducing an impact on an object wherein, in particular on a machine tool.

2. Background of the Invention

Impact inducing device is widely used in modal testing to analyze the modal parameters, namely the modal frequency and damping, as well as mode shape, of an object wherein. The impact inducing device imparts an impact to a structure wherein, while simultaneously measuring the response of the impact.

In machine tools, modal testing is important in order to analyze or predict the outcome of the machining processes, for example a milling process, in which vibrations may occur. In the milling process, chatter vibration is one of the major problems limiting the productivity. In order to predict chatter, the dynamics of a machining tool at the Tool Center Point are to be derived. While the machine tool is excited by an impact induced by the impact inducing device and its response measured by a sensor, the frequency response of the machine tool can be derived to characterize its dynamics. Due to their convenience of generating impulse forces at several locations, manual operating impact hammers are generally used to perform the excitation for modal testing. Nevertheless, one of the main drawbacks of manual operating impact hammer is that the impact level, the impact location and the excitation axis are difficult to be precisely repeated. In addition, if the testing is not performed in conditions representative of the real machining conditions, some influences on the machine dynamics, for example thermal effects, slight changes in preload or cross-coupling terms in the dynamics of the machine cause less precise predictions. However, if the testing is performed by manual excitation using an impact hammer in conditions representative of the real machining conditions, such as measurements performed on a rotating structure as it is necessary to identify the dependency of the dynamics of the tool on spindle speed, the risk of injury is high.

Therefore, an impact inducing device, which automatically induces the impact, can overcome the drawbacks mentioned above. There are few commercially available automatic impact hammers. However, such systems are very costly and not suitable for characterizing the machining tools where high versatility regarding the achievable excitation frequency band and robustness are required. Another challenge is to catch the bouncing device without inducing an additional significant signal in the time capture of the force sensor. Another existing device is a semi-automatic solution realized in form of a modal hammer pendulum. This approach has the drawback of being quite bulky, making the control of the position and orientation of the impact force difficult and merely useable in the vertical orientation. Moreover, due to its limited impact energy, it has limited application, for example only suitable for the excitation of small structures.

SUMMARY OF THE INVENTION

It is an aspect of this invention to provide an impact inducing device having an improved precision and repeatability of the impact excitation. In particular, it is an objective to provide a low cost impact inducing device enabling a user-friendly setting of different excitation forces in terms of frequency bandwidth and impulse energy. It is a further objective of this invention to provide an impact inducing device usable in hazardous testing conditions (e.g. rotating structure) which avoids double hitting the test object.

In the present invention, an automatic impact inducing device for inducing an impact on an object wherein, in particular on a machine tool. The device comprises a bolt unit, a sensor unit and a pullback mechanism. The bolt unit is arranged in a housing and is moveable in the axial direction of the bolt unit. The sensor unit is arranged outside of the housing and fixedly mounted in the front of the bolt unit including a tip for contacting the object. A force sensor is arranged between the tip and the bolt unit for measuring the force acted on the object. The pullback mechanism is operationally connected with the bolt unit and partially arranged in the housing behind the bolt unit and configured to store the energy required for inducing the impact in a storage element by pulling back the bolt unit. The pullback mechanism comprises an actuator and a coupling mechanism, which can couple the bolt unit with the actuator to pull back the bolt unit and decouple the bolt unit from the actuator to release the bolt unit for inducing the impact on the object.

For milling process, the frequency range of interest spans from low frequency to high frequency. The low frequency may be 50 Hz or lower depending on the size of the machine to characterize. The high frequency may be 5 kHz or higher when a micro milling process is considered. Therefore, it is essential to provide a device, which has a high versatility regarding the applicable excitation spectrum. To adjust the excitation frequency bandwidth, the bolt unit is designed to be exchangeable, such that bolt units having different mass or tip can be easily applied.

In one variant, at least two pairs of plain bearings arranged in the inner surface of the housing are provided to guide precisely the bolt unit such that the movement of the bolt unit is in a straight line.

In a preferred embodiment, the pullback mechanism comprises an electromagnet mounted on the actuator, in particular mounted on the end of the actuator arm. The bolt unit can be coupled with the actuator by activating the electromagnet and decoupled from the actuator by deactivating the electromagnet.

In one variant, a contacting surface is provided at the end of the bolt unit, which is contacted to the electromagnet when the electromagnet is activated due to magnetic force. Such coupling mechanism can be simply controlled, for example by regulating the current supplied to the electromagnet. In addition, the magnetic force is sufficiently high to provide a stable coupling between the bolt unit and actuator. A further advantage is the simple construction. Moreover, the electromagnet is a small element, which can be integrated in the housing.

In some embodiments, a control unit is provided to control the pullback mechanism to pull back the bolt unit from an initial position to a desired position such that a pre-determined energy can be stored in the storage element.

In one preferred variant, the energy storage element is an elastic element, in particular, a spring. The spring can be pre-tensioned by the linear actuator. The spring compression can be varied by adjusting the end position of the linear actuator, when the actuator is coupled with the bolt unit. The control unit is configured to adjust the spring compression of the spring to change the stored energy. The required energy for the impact is stored in the spring mounted between the bolt unit and the pullback mechanism. The required spring compression can be calculated based on the following equation: $\frac{1}{2} \cdot k_S \cdot s^2 = \frac{1}{2} \cdot m_b \cdot v_b^2$ where $k_S$ is the spring stiffness, s is the spring compression, $m_b$ and $v_b$ are the mass of the bolt unit and the resulting velocity of the bolt unit, respectively.

In one embodiment, a linear actuator is used to pull back the bolt unit. For example, a linear actuator with 100 mm stroke, a maximum force of 75 N and a maximum speed of 20 mm/s is chosen. An electromagnet having a maximum force of 65 N is applied to provide the sufficient high force to stably couple the bolt unit with the actuator. The electromagnet clamps the bolt unit by contacting a contacting surface mounted at the end of the bolt unit and pulls it backwards until the desired position is reached. Following that, the electromagnet is deactivated to release the bolt unit. After the release the linear actuator moves forward again to clamp the bolt unit for the next impact.

In order to improve the versatility of the device, the tip is exchangeable. Different materials result in different impact forces on the object. More specifically, depending on the mechanical properties (e.g. Young's modulus) of the tip material, the duration of the contact between the tip and target structure varies allowing converting the kinematic energy of the bolt into an impulse excitation of different frequency bandwidths. The tip can thus be made of different materials for generating a wide range of a bandwidth of the impact energy to improve the versatility of the device. Depending on the applications, the tip is made of Teflon, steel, recoil or rubber.

In some embodiments, a braking mechanism based on pneumatic principle is provided for decelerating the rebounding of the bolt unit after the bolt unit induces the impact on the object. To avoid distortion of the excitation spectrum, any force measured after the main impact should be less than 1% of the principle excitation force. This can be achieved by applying the braking mechanism to smoothly decelerate the movement of the bolt unit when it is rebounded after the impacting on the object.

The braking mechanism comprises a valve arranged for example on the sidewall of the housing and controlled by the control unit. The valve is opened to allow the air flow from the inside of the housing to the outside, when the bolt unit moves in the direction of the object. The valve is closed when the bolt unit is rebounded from the object to stop the air flow from the inside of the housing.

In order to control the valve, it is essential to detect the rebounding of the bolt unit without delay. For this purpose, the position of the bolt unit is monitored by an optical sensor arranged in on the side wall of the housing, in particular a laser and a photodiode are arranged oppositely in the radial direction on the housing. The optical sensor is preferably arranged in the front part of the housing such that the rebounding of the bolt unit can be detected as early as possible.

BRIEF DESCRIPTION OF THE DRAWINGS

In order to describe the manner in which advantages and features of the disclosure can be obtained, in the following a more particular description of the principles briefly described above will be rendered by reference to specific embodiments thereof which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which:

FIG. 8 and FIG. 8a respectively illustrate an assembled and exploded views of the bolt unit;

FIG. 11 illustrates an exploded view of a housing front part;

FIG. 12 illustrates an exploded view of a housing rear part; and

EXEMPLARY EMBODIMENTS

Figure 1:
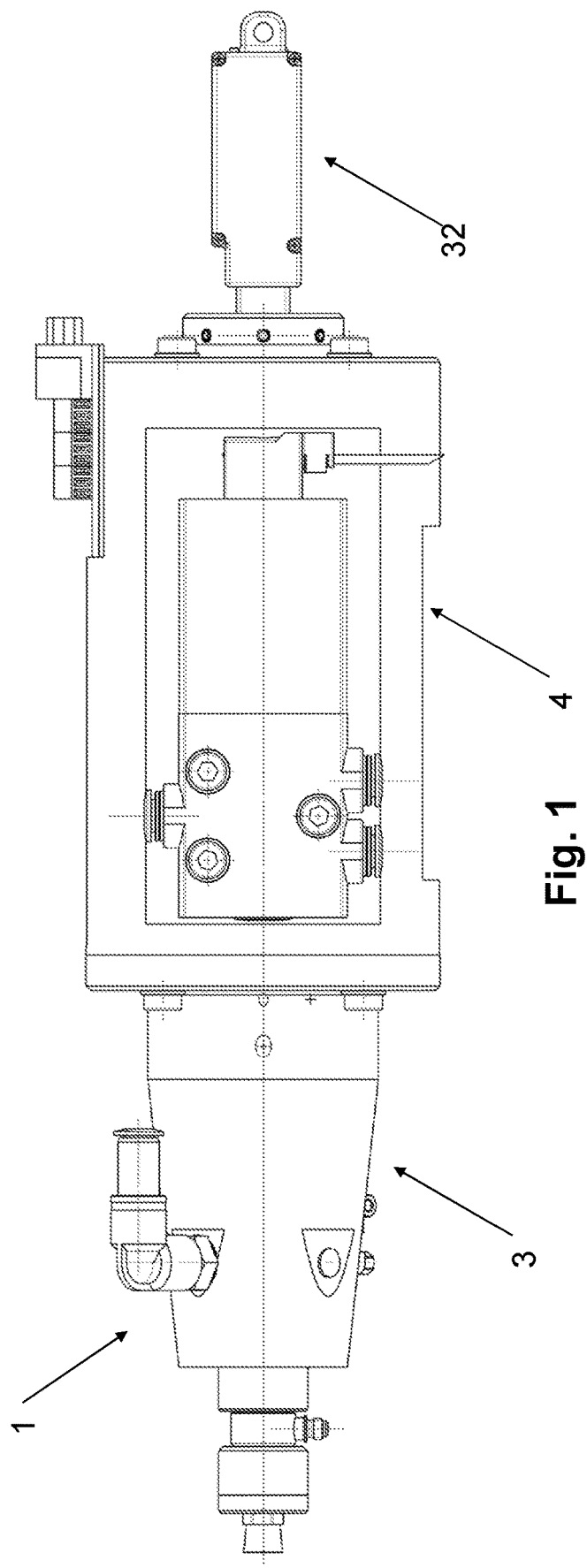
FIG. 1 illustrates an assembled view of an automatic impact inducing device.
Figure 2:
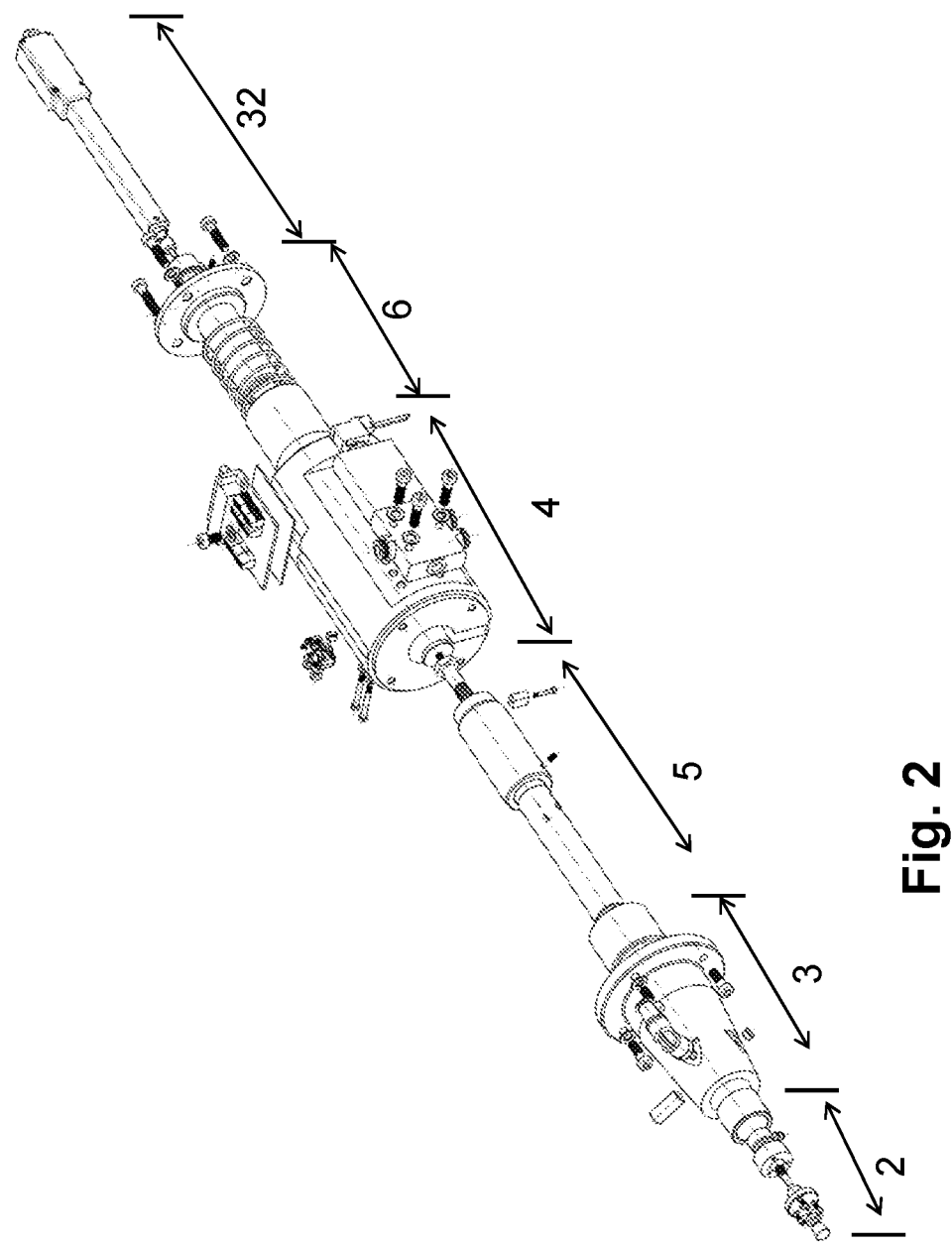
FIG. 2 illustrates an explode view of the automatic impact inducing device.

FIGS. 1 and 2 show the views of the automatic impact inducing device 1 in the assembled state and the exploded state, respectively. As shown in FIG. 2 the device comprises a sensor unit 2, a housing front part 3, a bolt unit 5, a housing rear part 4, a storage element 6 and a linear actuator 32. The detailed illustration of each of these parts is shown in the subsequent figures.

To allow a fully automated impact the following functions need to be fulfilled: pulling back the bolt unit, storing energy for impact, releasing the bolt unit and decelerating the rebounding bolt unit. Firstly, the device needs to be capable of pulling back the bolt unit to a desired position and of releasing it at a given moment. Secondly, the energy storage element is required to store the energy that is needed to accelerate the bolt unit. Thirdly, in order to avoid unwanted disturbance in the force signal measured by the sensor unit, the back movement of the bolt unit needs to be decelerated as smoothly as possible.

Figure 3:
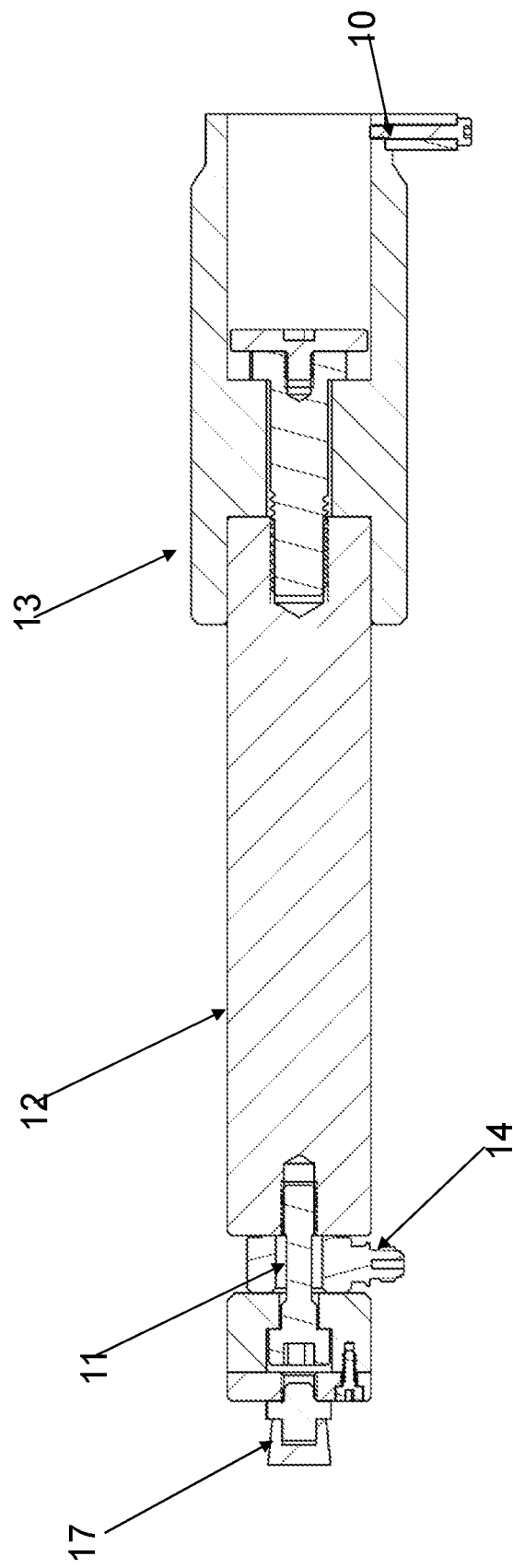
FIG. 3 illustrates a sectional view of a bolt unit and a sensor unit.

FIG. 3 shows a sectional view of the sensing unit and the bolt unit mounted together, which are moveable in the axial direction thereof. A modular bolt unit 5 comprises a front bolt 12 and a rear bolt 13. A force sensor 14 is mounted between a tip 17 and the front bolt with a pre-tensioning bolt 11. The force sensor requires a given pretension in order to ensure a correct measurement of compression and tension efforts. The rear bolt is connected to the front bolt and both parts are exchangeable, so that depending on the density of the bolt materials, impacts with different characteristics can be generated.

Figure 4:
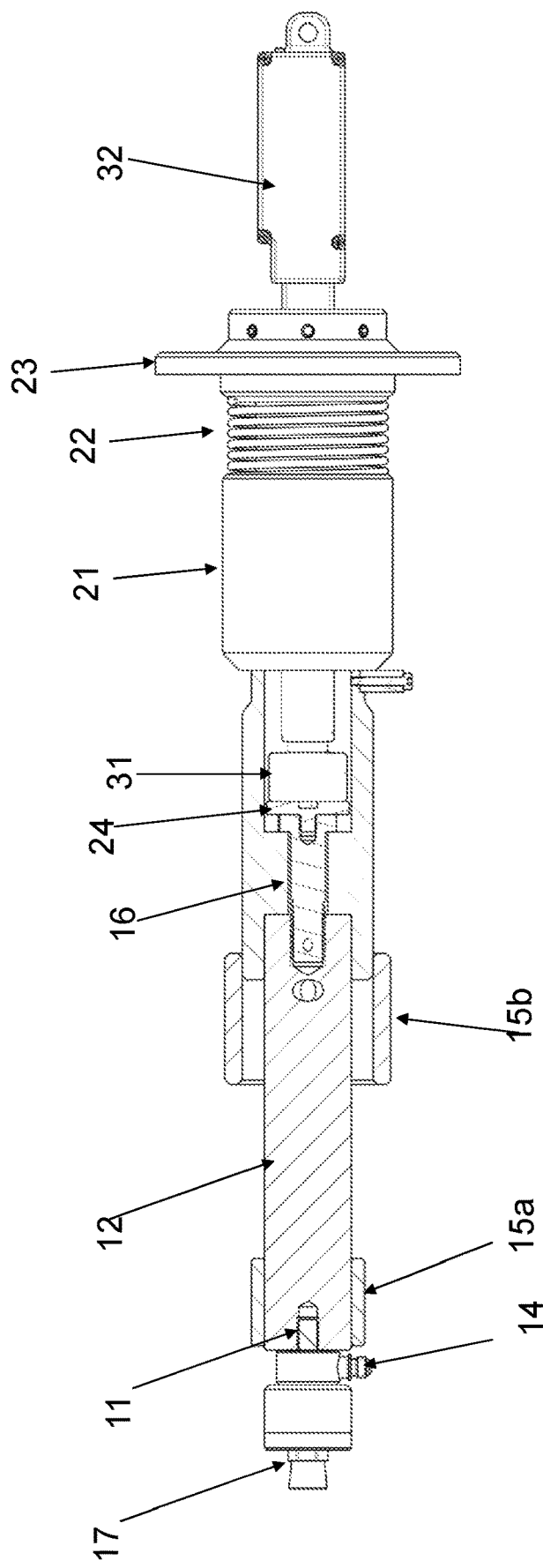
FIG. 4 illustrates a sectional view of a pullback mechanism.

FIG. 4 shows a sectional view of the pullback mechanism. The bolt unit is guided by two plain bearings 15a 15b in the axial direction, which are fixed mounted on the inner surface of the housing front part. The mass of the front bolt and the rear bolt are designed to be dependent on the requirement of the impact spectrum. The pullback mechanism comprises the actuator 32 and a coupling mechanism for coupling the bolt unit and the actuator to pull back the bolt unit. The coupling mechanism is realized by mounting an electromagnet 31 at the one end of the actuator arm. If the pullback mechanism is activated, the electromagnet 31 is switched on and a polished contact surface 24 arranged at one end of the bolt unit is thereby connected to the electromagnet arranged on the actuator 32. The actuator is controlled by a control unit to pull the bolt unit in the opposite of the impact direction to a desired position, while a spring 22 positioned between a spring cap 21 and a housing cap 23 is compressed to store the energy required for inducing an impact on a test object. When the bolt unit reaches the desired position, the electromagnetic is switched off and the bolt unit is decoupled from the actuator since the contacting surface 24 and the electromagnet 31 are disconnected, thereby the bolt unit is released and accelerated in the direction of the object to induce an impact thereon. After the decoupling from the bolt unit, the actuator moves back in the initial position to be ready for coupling the bolt unit for the next pulling back and release.

Figure 5:
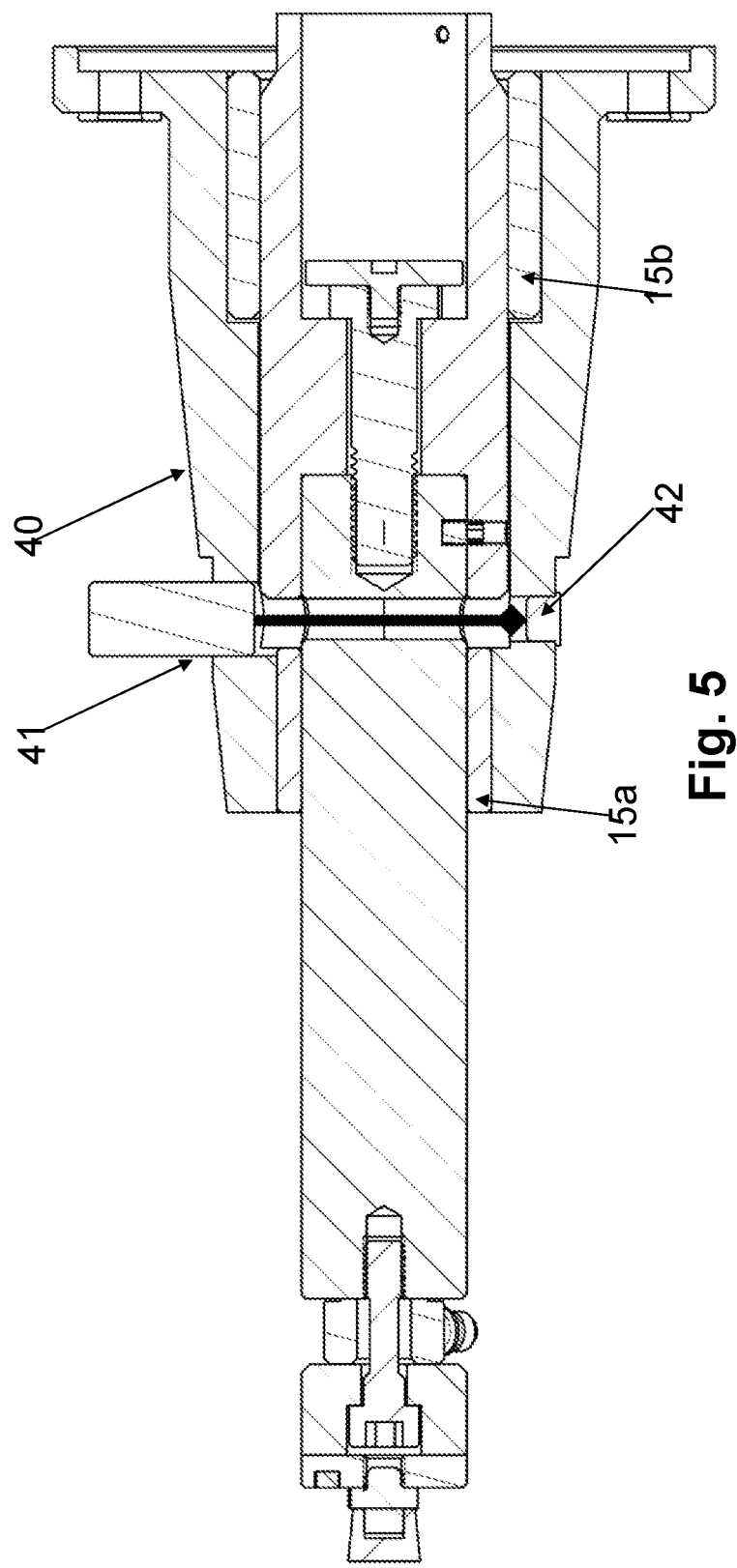
FIG. 5 illustrates a sectional view of a monitoring of the bolt position with an optical sensor.
Figure 6:
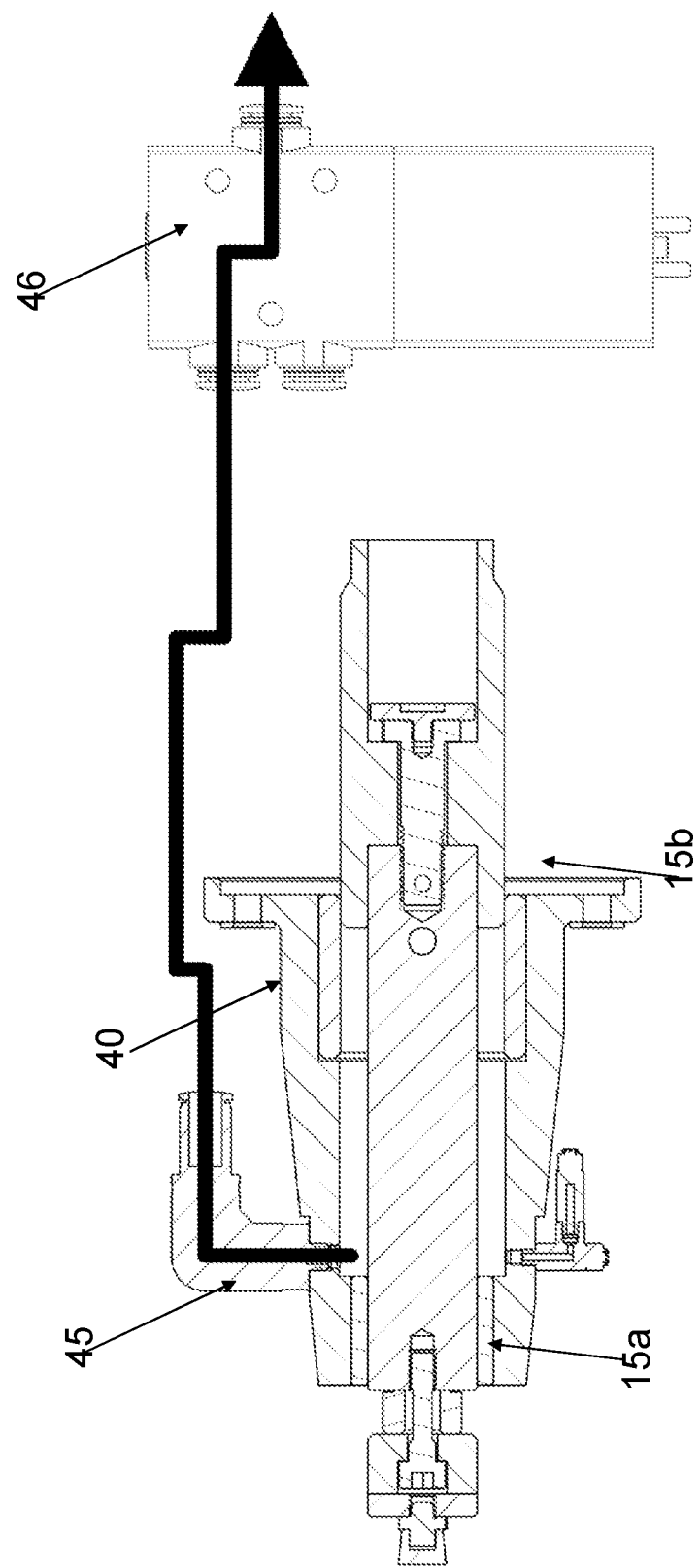
FIG. 6 illustrates a sectional view of a braking mechanism, when a valve is open.

FIGS. 5 and 6 show sectional views of the braking mechanism. The pneumatic braking mechanism is activated by an optical sensor, for example an optical sensor 42 and a laser 41 arranged on the opposite of the optical sensor. A valve is provided on a cylinder 40 of the front part of the housing. On the side wall of the cylinder a pipe 45 is provided to be connected to an external magnetic valve 46. Before releasing the bolt unit, the magnetic valve is opened such that the air can escape from the cylinder having the front bolt arranged therein. After the bolt is released, the magnetic valve is still open, such that the bolt can freely move in the direction of the test object. When the rebounding bolt is detected by the photodiode, the magnetic valve is closed with a short delay to allow the bolt rebounded for a short distance. After the magnetic valve is closed, the air flow from the cylinder to outside is stopped and the moving bolt is thereby braked. When the movement of the bolt unit is stopped, the magnetic valve is open again for the next release.

FIG. 6 shows the state when the magnetic valve is open and the air can flow out of the cylinder.

Figure 7A:
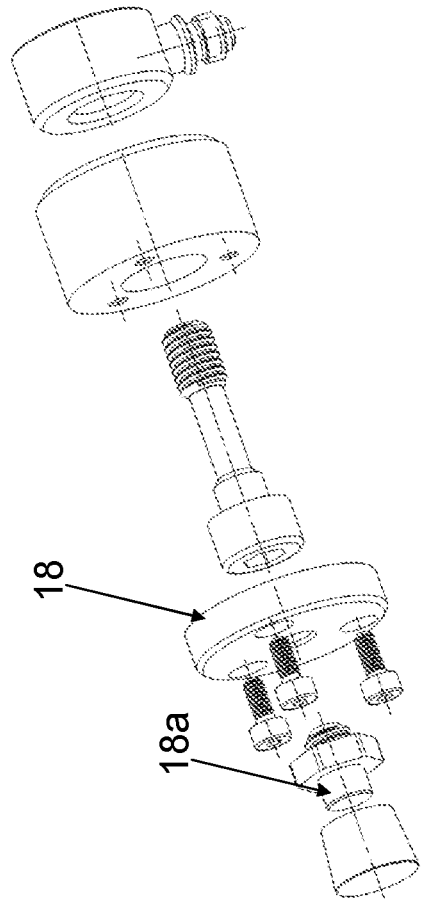
FIG. 7 and FIG. 7a respectively illustrate an assembled and exploded views of the sensor unit.
Figure 7:
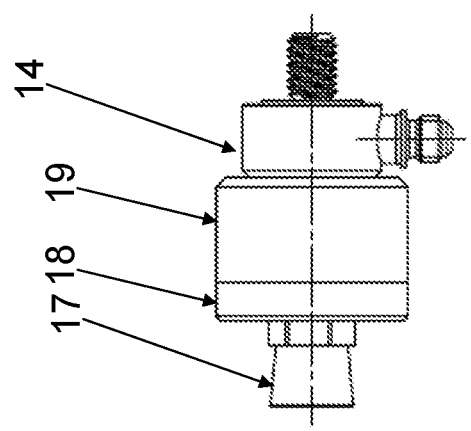

FIGS. 7 and 7a show the views of the sensor unit in the assembled and the exploded state. The sensor unit includes the tip 17, a tip holder 18, a spacer disc 19 and the force sensor 14, which are connected by two screws in series. The tip is exchangeable mounted on the tip holder 18 through a tip screw 18a. One end of the tip screw 17a can be screwed into the tip holder and on the opposite end of the tip screw a protrusion is provided to mount the tip thereon.

FIG. 8, 8a show the views of the bolt unit in the assembled state and the exploded state. The front bolt 12 is partly inserted in the axial direction in the rear bolt 13, which has a tubular shape. The front bolt is connected with the rear bolt through a bolt screw 25 from one end of the rear bolt. On the other end of the bolt screw 25 the polished contacting surface 24 is fixed thereon to enable the coupling of the bolt unit with the actuator 32 shown in FIG. 1 and has a guide pin 10 fixed to the rear bolt to avoid the rotation of the bolts around the impact axis.

Figure 9:
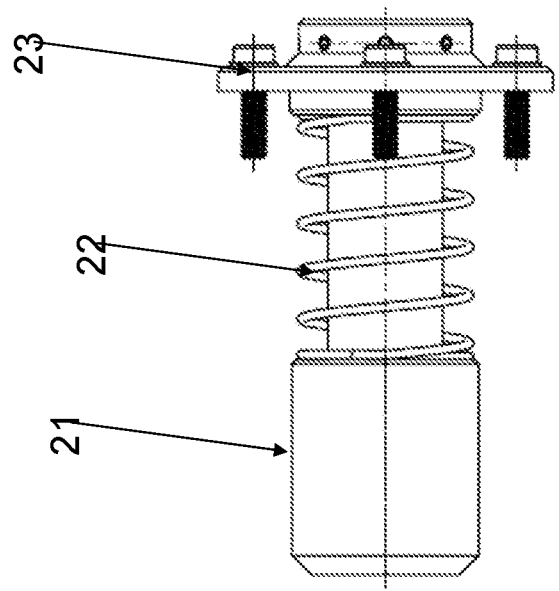
FIG. 9 illustrates a side view of a storage element.

FIG. 9 shows the view of the storage unit in the assembled state. A housing cap 23 has a tubular element with an enlarged head at one end. At the opposite of the end of the tubular element a spring cap 21 is mounted for stopping a spring 22 received around the tubular element and between the spring cap and the disc element of the housing cap. The spring cap is moveable in the axial direction to compress the spring when the bolt is pulled back by the actuator or decompress the spring when the bolt is after the pullback released.

Figure 10:
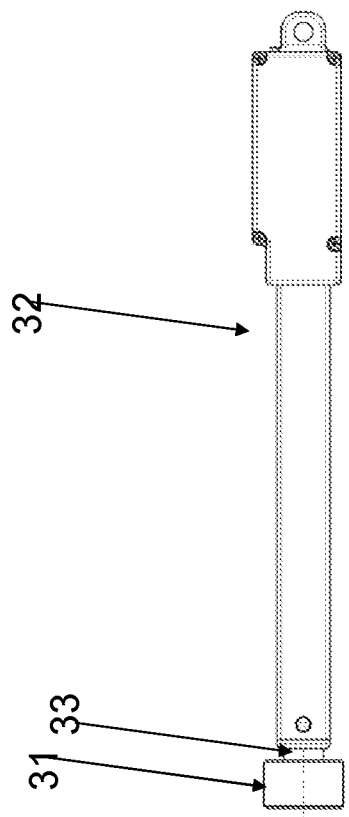
FIG. 10 illustrates a side view of an actuator.

FIG. 10 shows the actuator 32 provided at the end of actuator arm with an electromagnet 31, which is fixed by a magnetic screw 33. The electromagnet 31 can be activated by a control unit for coupling the bolt unit with the actuator to pull the bolt unit back in a desired position.

FIGS. 11 and 12 show the front housing part and the rear housing part, respectively. The front housing part includes a cylinder 40, which is fixed with the housing rear part 4. The plain bearings 15a and 15b are fixed mounted on the inner surface of the cylinder 40. The laser 41 and the photodiode 42 are arranged in two openings on the wall of the cylinder for detect the position of the bolt unit. Another opening is provided on the wall of the cylinder to connect a valve, which can be connected to the magnetic valve externally.

In one embodiment, the magnetic valve 46 is arranged on the outer surface of the rear part housing 4.

Figure 13:
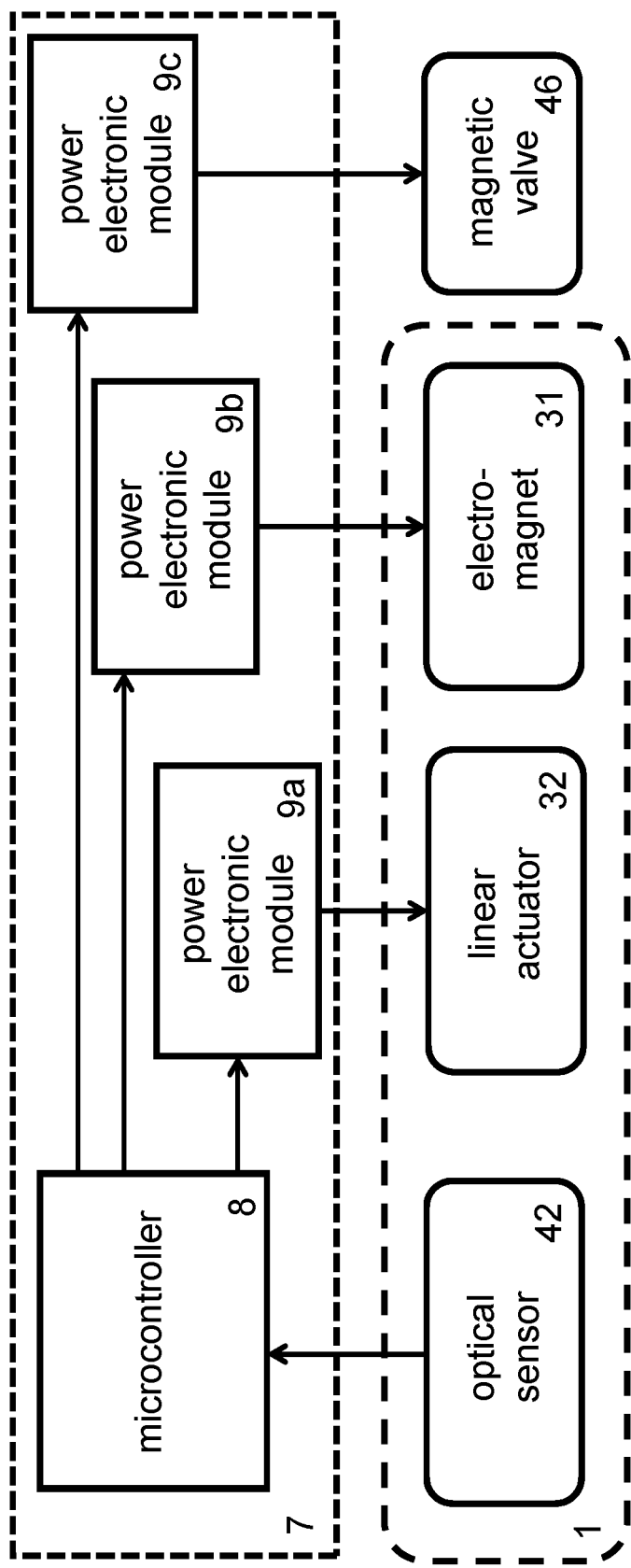
FIG. 13 illustrates a schematic of control unit.

FIG. 13 shows a control unit 7, which enables the automatization of the impact inducing device. The modal testing to analyze the modal parameters of a machine tool can be conducted without manual operating. The control unit comprises a microcontroller 8 and a power electronic module 9. The microcontroller is configured to receive the input signals from the impact inducing device and generate the control signals for the power electronic module, which directly activate or deactivate the components of the impact inducing device. For example, the microcontroller sends the control signal to a first power electronic module 9a, which commands the movement of the linear actuator 32. A second power electronic 9b includes mainly transistors. By controlling the gate voltage of the transistors, the electromagnet 31 can be activated or deactivated, thereby the actuator can be coupled with the bolt unit to perform the pullback mechanism. In addition, the control unit commands the braking mechanism. For example, the optical sensor 42 detects the position of the bolt unit and sends an input signal to the microcontroller, which controls a third power electronic module 9c to open or close the magnetic valve 46.

The invention claimed is:

1. An automatic impact inducing device for inducing an impact on an object, the device comprising:
a bolt unit arranged in a housing and being moveable in the axial direction of the bolt unit;
a sensor unit fixedly mounted in the front of the bolt unit including a tip for contacting the object and a force sensor arranged between the tip and the bolt unit for measuring the force acted on the object;
a pullback mechanism operationally connected with the bolt unit and arranged behind the bolt unit, the pullback mechanism is configured to store the energy required for inducing the impact in a storage element by pulling back the bolt unit;
wherein the pullback mechanism includes an actuator and a coupling mechanism, which can couple the bolt unit and the actuator to pull back the bolt unit and decouple the bolt unit from the actuator to release the bolt unit for inducing the impact on the object; and wherein the actuator is a linear actuator;
a braking mechanism configured to decelerate the rebounding of the bolt unit after the bolt unit induces the impact on the object;

a control unit configured to control the pullback mechanism to pull back the bolt from an initial position to a desired position such that a pre-determined amount of energy is stored in the storage element; and a valve controlled by the control unit, the control unit opens the valve when the bolt unit moves in the direction of the object, and the control unit closes the valve when the bolt unit is rebounded from the object.

2. The automatic impact inducing device according to claim 1, wherein the pullback mechanism comprises an electromagnet mounted on the actuator and wherein the bolt unit can be coupled with the actuator by activating the electromagnet and decoupled from the actuator by deactivating the electromagnet.

3. The automatic impact inducing device according to claim 1, wherein the storage element is an elastic element.

4. The automatic impact inducing device according to claim 3, wherein the control unit is configured to adjust a spring compression of the spring to change the stored energy.

5. The automatic impact inducing device according to claim 1, wherein the bolt unit includes a front bolt and a rear bolt exchangeably connected to the front bolt.

6. The automatic impact inducing device according to claim 1, wherein the tip is exchangeable, and the tip is made of at least one of Teflon, steel, resofil or rubber.

7. The automatic impact inducing device according to claim 1, wherein the braking mechanism is based on a pneumatic principle.

8. The automatic impact inducing device according to claim 1, wherein a position of the bolt unit is monitored by a laser and a photodiode arranged oppositely in the radial direction on the housing, and connected to the control unit for the control of the valve.

* * * * *